(12) United States Patent
Luke (10) Patent No.: US 7,107,544 B1
(45) Date of Patent: Sep. 12, 2006

(54) DISPLAY OF MESSAGES

(75) Inventor: James Steven Luke, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/453,127

(22) Filed: Dec. 2, 1999

(30) Foreign Application Priority Data

Aug. 25, 1999 (GB) ................................. 9919990.3

(51) Int. Cl.
*G06F 13/00* (2006.01)
*G06F 15/00* (2006.01)

(52) U.S. Cl. ..................................... 715/752; 715/807

(58) Field of Classification Search ................ 345/732, 345/744, 765, 790, 804, 808; 715/752, 804, 715/805, 807, 811, 765
See application file for complete search history.

(56) References Cited

U.S. PATENT DOCUMENTS

| | | | |
|---|---|---|---|
| 5,675,733 A | 10/1997 | Williams | 395/200.01 |
| 5,694,616 A | 12/1997 | Johnson et al. | 395/860 |
| 5,751,270 A * | 5/1998 | Rhodes | 345/118 |
| 5,765,170 A | 6/1998 | Morikawa | 707/200 |
| 5,765,178 A | 6/1998 | Tanaka | 707/526 |
| 6,141,006 A * | 10/2000 | Knowlton et al. | 345/764 |
| 6,185,603 B1 * | 2/2001 | Henderson et al. | 709/206 |
| 6,282,578 B1 * | 8/2001 | Aizono et al. | 709/310 |

FOREIGN PATENT DOCUMENTS

| | | |
|---|---|---|
| EP | 0413537 | 8/1990 |
| EP | 0420779 | 8/1990 |
| WO | 9904353 | 1/1999 |

* cited by examiner

*Primary Examiner*—Cao (Kevin) Nguyen (57) ABSTRACT

A message viewer for generating a prioritized view of a plurality of messages stored in an email mailbox is disclosed. The viewer includes a script for defining one or more concepts against which a message can be prioritized, the or each concept comprising one or more conditions against which a message can be tested. A display script operates on each message, to generate a fit to a selected one or more of the concepts, the fit corresponding to whether or not the message fulfils the conditions. Once complete, the display script creates a display representative of the respective fits of the messages to the one or more selected concepts.

18 Claims, 5 Drawing Sheets

Priority Definition Dialogue

| Concept Name | Scenarios | |
|---|---|---|
| Priority Project | Scenario 1 | Originator<br>Salesteam OR Client |
| Crisis Sale | Scenario 2 | Phrase<br>Upset AND Endanger |
| Dispute | Scenario 3 | Number Of Emails<br><br>Last Exchange<br>>1 day<br><br>Display Parameter<br>Red |

Priority Definition Dialogue

Concept Name
- Priority Project
- Crisis Sale
- Dispute

Scenarios
- Scenario 1
- Scenario 2
- Scenario 3

Originator: Salesteam OR Client

Phrase: Upset AND Endanger

Number Of Emails:

Last Exchange: >1 day

Display Parameter: Red

DISPLAY OF MESSAGES

BACKGROUND OF THE INVENTION

1. Field of Invention

The present invention relates to an improved display aimed at assisting a user in the prioritisation of effort applied to reading and responding to messages.

2. Description of the Related Art

Email systems generally provide the user with a number of core directories, or folders, which usually comprise: an inbox to which all new messages are added; an outbox containing those messages which have been sent; and a deleted or trash folder containing recently deleted messages—once an update, such as a replication with a server, has been requested this folder is usually emptied.

In addition to these folders, users are usually provided with the ability to create hierarchies of new folders, for example one for each of their different work activities, and store emails in those folders and sub-folders. Traditionally, the user is provided with the ability to view summary information for a list of the email messages in a folder. The summary information includes: the originator of the message; the subject heading; and the date and time of receipt.

In addition to this information, some email systems, such as Lotus Notes, enable the user to allocate categories to a message such as: urgent; for your information; or company confidential. These additional categories are also shown when viewing the summary information for email messages in each folder. For example, Lotus Notes displays those messages flagged as urgent with a red exclamation mark alongside them.

A challenge being faced by the many email recipients, particularly in the commercial sector, is that the volume of email received is increasing. In some extreme cases email recipients may receive in excess of a hundred messages a day relating to any one of their ongoing work activities. Some email systems are providing agent based capabilities which automatically filter email to reduce the volume of apparently unactioned messages.

Nonetheless, in deciding how to deal with messages, recipients face the following problems: it is difficult to prioritise the actioning of messages. This is because reading email is time consuming, especially when very large numbers of messages are received, and simply scanning the directory lists represents an ineffective approach to prioritisation. For example, unimportant messages are occasionally flagged as urgent whilst very important messages may be received from an unknown sender with no subject listed; the current email display mechanisms, in particular those which use folders and lists of message, do not necessarily represent the recipient's priorities; not all email requires immediate action and in some cases a recipient may wish to take time to consider a response. In such case the email must either be filed or it gradually drifts down the email display. In either case it is possible to forget a response; messages are occasionally filed incorrectly and are then overlooked in subsequent reviews; and email psychology tends to focus individuals on maintaining a tidy inbox as opposed to an effective prioritisation of work activity.

It is an object of the present invention to provide an improved display aimed at assisting users in prioritisation of work through the use of message priority definition and graphical display of prioritised messages.

Accordingly, the invention provides a method for generating a prioritized view of a plurality of messages, comprising the steps of: defining one or more concepts against which a message can be prioritized, the or each concept comprising one or more conditions against which a message can be tested; for each message, generating a fit to a selected one or more of said concepts, said fit corresponding to whether or not said message fulfils said conditions; and creating a display representative of the respective fits of said messages to said one or more selected concepts.

While the problems addressed by the invention are described in terms of email messages, it will be seen that the invention can be applied to the prioritisation of work associated with messages of any type.

Nonetheless, in relation to email systems, a discussion thread is the term used for the group of messages resulting from users replying to messages received from another user. Some email systems provide functionality enabling the user to view the summary information of messages grouped in discussion threads. In a preferred embodiment of the present invention, the messages are grouped into discussion threads before being displayed according to the invention.

BRIEF DESCRIPTION OF THE DRAWINGS

Embodiments of the invention will now be described with reference to the accompanying drawings, in which.

DESCRIPTION OF THE PREFERRED EMBODIMENT

Figure 1:
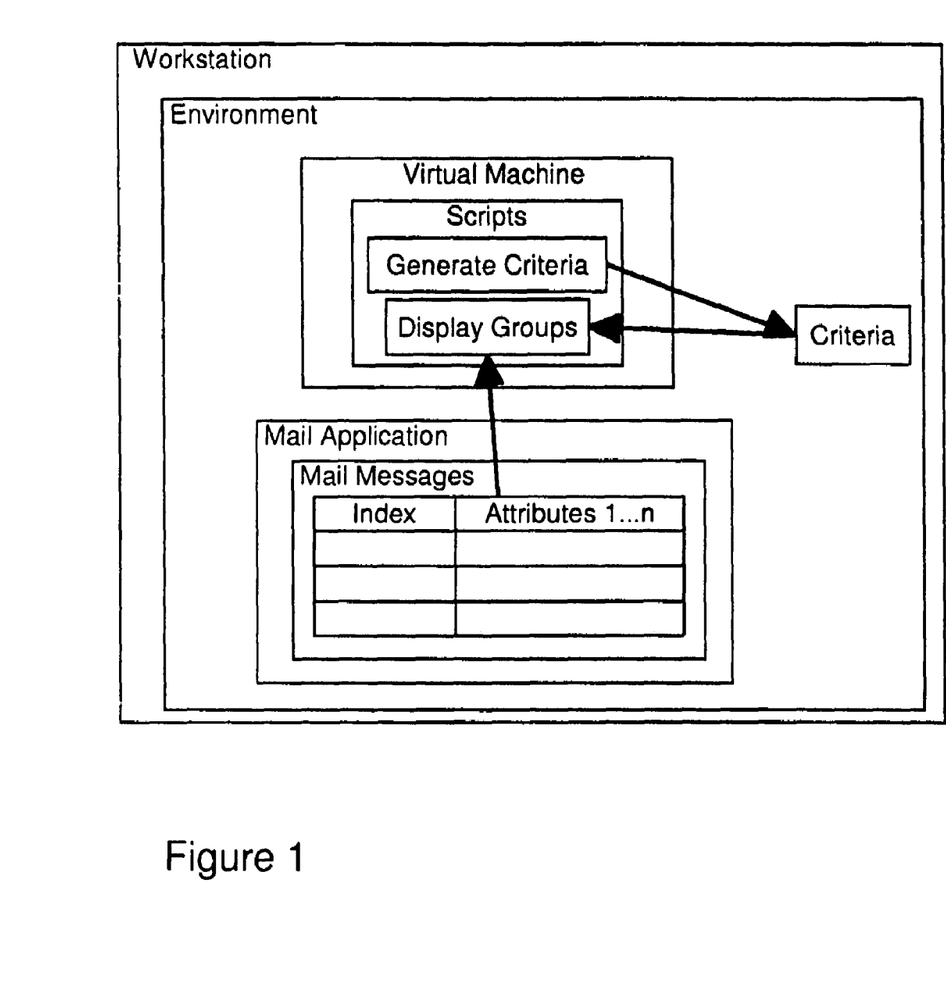
FIG. 1 is a block diagram of an email system.

Referring now to FIG. 1, where a preferred embodiment of the invention based on a Lotus Notes mailbox is described. The Lotus Notes mail box is one of many applications capable of running on Lotus Notes. In Lotus Notes, the mailbox is a database in which each message is an object having a plurality of attributes, for example, "Body" includes the text of a message and "Subject" includes the subject line. While other email applications may not be strictly based on a database core, messages can nonetheless be thought of as individual objects having identifiable attributes, such as To, From, Subject, Body and Date.

In common with other Lotus applications and also Microsoft applications, a scripting language is provided within the Notes environment, enabling an application developer to either develop applications from scratch or to customise existing applications such as the mailbox.

In Lotus Notes, the scripting language, LotusScript, is used. Nonetheless it can be seen that the invention can be deployed within any email product using for example Visual Basic macros for Microsoft Exchange. Alternatively, the invention may be implemented as an integral part of any email product, using the API of the product.

In the preferred embodiment, two scripts are provided:
  a criteria generating script which enables a user to interactively enter a prioritisation definition; and a display script which accesses email messages, divides the messages into groups, parses the messages, applies the prioritisation definitions to the results of the email parsing and displays those results graphically for subsequent retrieval by the user.

In a preferred embodiment of the invention, the user may either be viewing one of the core folders, for example, the inbox, or one of a number of user defined folders. A button or icon is provided enabling the user to select a prioritized view generated according to the invention.

In the preferred embodiment, the display script responds to the button or icon being selected, to first group messages appearing in the currently viewed folder into discussion threads.

In Lotus Notes, every message has a unique identifier. A message which is a response to an outgoing message includes a $REF attribute which stores the unique identifier of the outgoing message. More than one response to an outgoing message may be stored in an in-box and responses may in turn be replied to leading to hierarchical groups of messages in a discussion thread.

Figure 2:
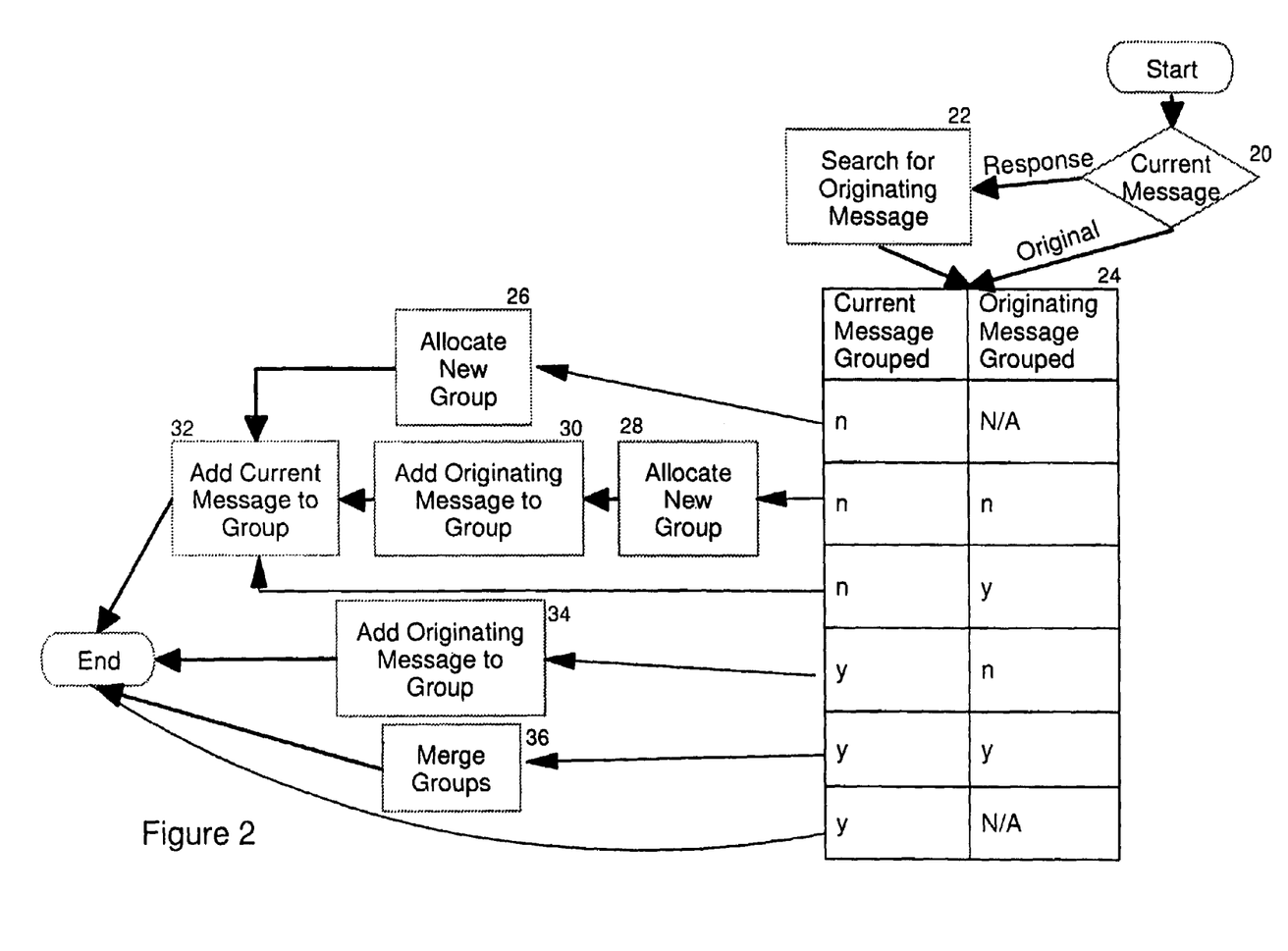
FIG. 2 is a flow diagram of a portion of a script for graphical display of prioritised messages.

With reference to FIG. 2, the display script groups messages by looping through all messages in the folder currently being viewed. The script initially determines if a message is an original message or a response, step 20. If the message is a response, (even if it had been an originator for another message), the script checks for the originating message by searching in the currently viewed folder for a message having the identity stored in the $REF attribute, step 22. A table 24 is then used to determine the next course of action. In the table, N/A means that either the current message is an original, so there is no originating message, or if the current message is a response, the originating message was not found.

If the current message is an original or if there is no message in the folder with an identity matching the $REF attribute, a new group is allocated and the current message added to the group, steps 26 and 32. If the originating message is found and neither message is in a group, the response message and the original message are added to a new group, steps 28 to 32. If the originating message is found and is already in a group and the current message is not in a group, the current message is added to this group, step 32. If the current message is in a group and the originating message is not in a group, then the originating message is added to the group, step 34. If both the current and originating messages are in groups, then the groups, if different, are merged, step 36. Finally, if the current message is grouped and an originating message is not available, nothing needs to be done.

It will be seen that messages may in fact be related although they may not be in such rigidly defined discussion threads, and this may result in an unnecessarily large number of groups being generated.

It is therefore preferable that groups containing more than one message, discussion thread groups, should be used as seed groups with which groups containing fewer messages might possibly be merged, single message groups.

A number of criteria can be used to merge groups. Groups can be merged if, for example:

a substantial portion of the subject line of a single message group appears in any message of a discussion thread group; or
  the sender or recipient (according to whether the message was received or sent by the mailbox owner) of a message in a single message group matches one or more names in the From or To lines in any message of a discussion thread group.

In any case, it is preferable to provide a "No Category" group for messages that remain in single message groups. At a later stage the user may manually transfer messages from the "No Category" group to any of the other groups or create a new group.

Groups can be simply given numerical names such as "Discussion Thread #n", or the display script can use some analysis of the subject lines or senders/recipients of messages within a group to determine a meaningful name. For example, if the same or mostly the same subject line is used in most messages in a group, this can provide the name of the group; or the messages are all received or sent to one other person, that person's name can be used.

Groups can be further merged if, for example, groups of keywords are either manually associated with a group by a user or if they are automatically extracted from the respective Bodies of messages in a group. Thus, if the same keyword is associated with more than one group, those groups can be merged.

This leads to an alterative manner of grouping messages which can be particularly useful where the user is looking at messages that are stored in hierarchical folders. In this case, the display script simply groups messages according to the folder in which they are stored, or if the user is looking at messages in a folder, messages can be grouped according to sub-folder. It should be seen that in this case, the folder names also provide readily meaningful names for the groups.

Once messages are grouped, the display script now assesses each message against a pre-defined prioritisation concept.

Figure 3:
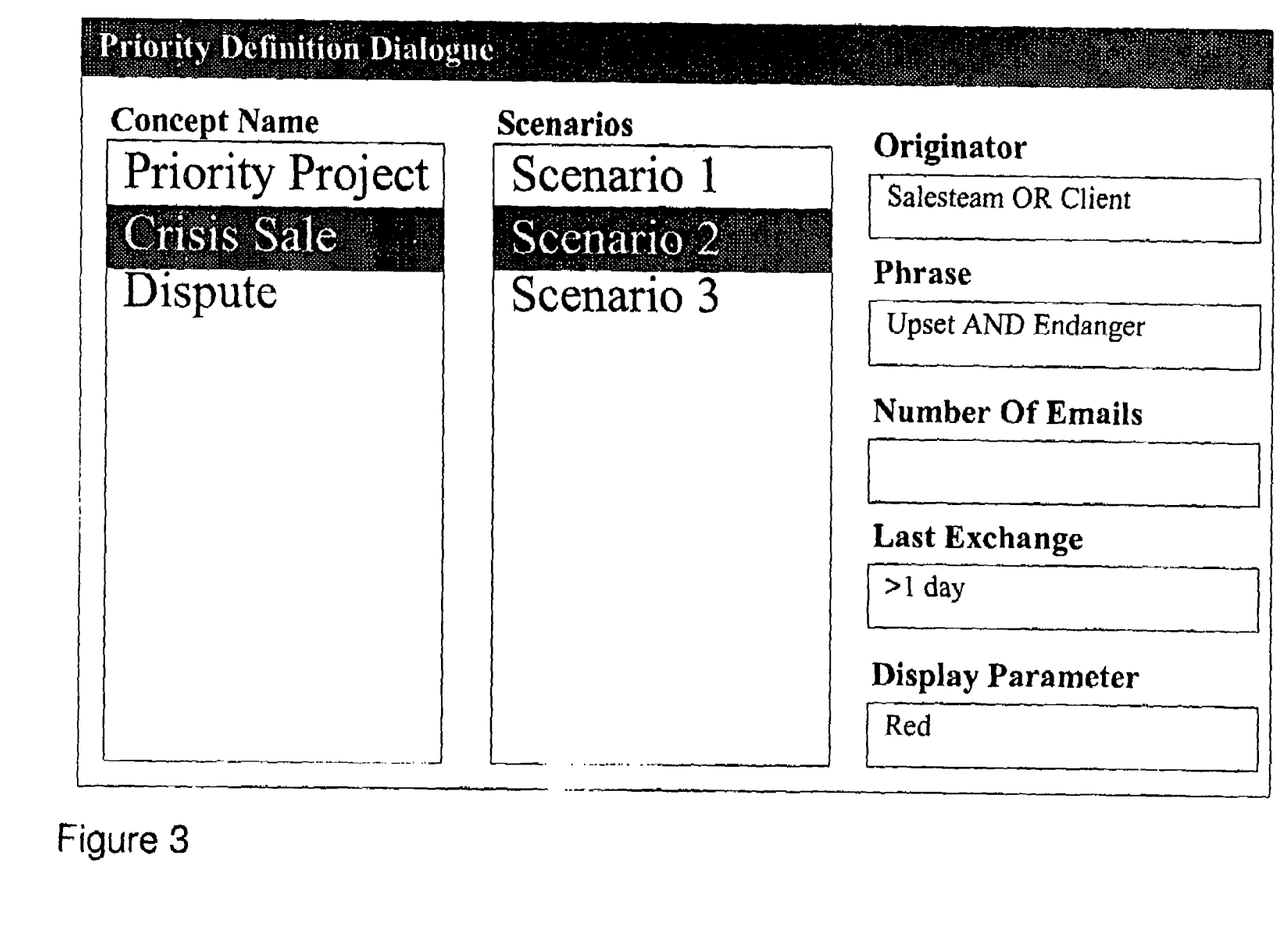
FIG. 3 shows a priority definition dialog box.

FIG. 3 presents a schematic of a dialog box presented by the criteria generating script. The box enables a user to interact and define a series of concepts which are used to prioritize messages—clearly this needs to have been done, either by a user or supervisor—remotely or locally, before the user can meaningfully run the display script.

Nonetheless, in a typical interaction, the user right clicks with a mouse button on the Concept Name box and is presented with a pop-up menu allowing for addition, deletion, renaming etc. of a concept. For each concept, the user is able to specify one or more scenarios which determine the applicability of message to a concept.

In the present embodiment, the user can specify a number of conditions for a given scenario:

the name of the sender—enabling a recipient to rank the importance of individual email authors. The name could be specified as either an individual or a member of a certain group in an address book—assuming one is associated with the email application.

the occurrence of key phrases—in its simplest form this could include a client's name or a subject. A more complex mapping could include searches for words or phrases which represent more subtle concepts such as an argument between two team members. Examples of such phrases are, "strongly disagree" or "inappropriate action".

the number of emails exchanged—indicating the intensity of activity in a particular group. It will be seen that in the message grouping phase described above, the system determines how many messages are associated with a given discussion thread. It is therefore useful, even if discussion threads have subsequently been merged into a single group, to keep track of the number of messages in the discussion thread to which a message belongs. A discussion thread containing a large number of messages may indicate a "hot" topic even within a group containing a large number of other messages.

the time since the last message in the group—indicating that a response is awaited from the user to an incoming message or from a member of the group to which the user sent a message. Again the message grouping phase can be adapted to provide for this condition, by noting the last message in a discussion thread hierarchy. A further check on the last person to contribute to the discussion thread and the specified recipients would enable some inference regarding the source of the delay.

For the example in FIG. 3, the recipient has specified the three concepts: "Priority Project" (for example a project approaching acceptance), "Crisis Sale" (for example an opportunity where the Client is upset with the company) and "Dispute" (for example an argument within a group). For each of these concepts the recipient is able to define one or more scenarios where each scenario comprises a number of conditions.

In the case of FIG. 3, one of the scenarios representing the concept of a "Crisis Sale" has been defined using a combination of the 4 available conditions:

the Originator of the email is either a member of the sales team or a client. Membership of groups can be determined through comparison with the Users Address book which provides the facility to define address groups.

Alternatively the user could specify an actual email address.

the Body of the email includes the words "Upset" and "Endanger". For example, this condition would be met if the Body of the email included the phrase, "at our last meeting the Client was very upset and stated that this development would endanger our future relationship".

the number of emails field has been left blank. In this scenario the number of emails in the discussion thread is not considered significant as a single email can represent a business critical issue. In a scenario representing a "Dispute" the number of emails exchanged could be considered significant.

the last email exchange field has been set as greater than 1 day. In this scenario this indicates that a potential problem (Sales Crisis) has been identified, however no response has been forthcoming.

The display script applies a simple, weighted voting scheme to calculate a fit to the conditions specified by the email recipient. The best fit corresponds to the highest priority mail and is represented using the Display Parameter which is also specified by the recipient in the priority definition dialogue box.

Thus, in the example of FIG. 3, where the user intends prioritizing the display of messages according to the concept of "Crisis Sale", the display script compares each message against each of the three scenarios for the concept. In the present embodiment, the best fit from the three scenarios is taken as the final fit. Alternatively, the fit from the three scenarios could be aggregated to give the final fit.

The final step in defining a concept is to select a display parameter. In the present embodiment, the parameter can be either one of a number of colours, for example, red, green or blue; or size. It should be noted that the display parameter is the same for each scenario in a concept and as such the display parameter dialog box can alternatively be displayed in a separate window associated with the concept name rather than with the scenario conditions.

Use of a selectable display parameter enables a user to prioritize mail against more than one concept at a time or simply to select the display parameter for a single concept which they comprehend most readily.

Figure 4:
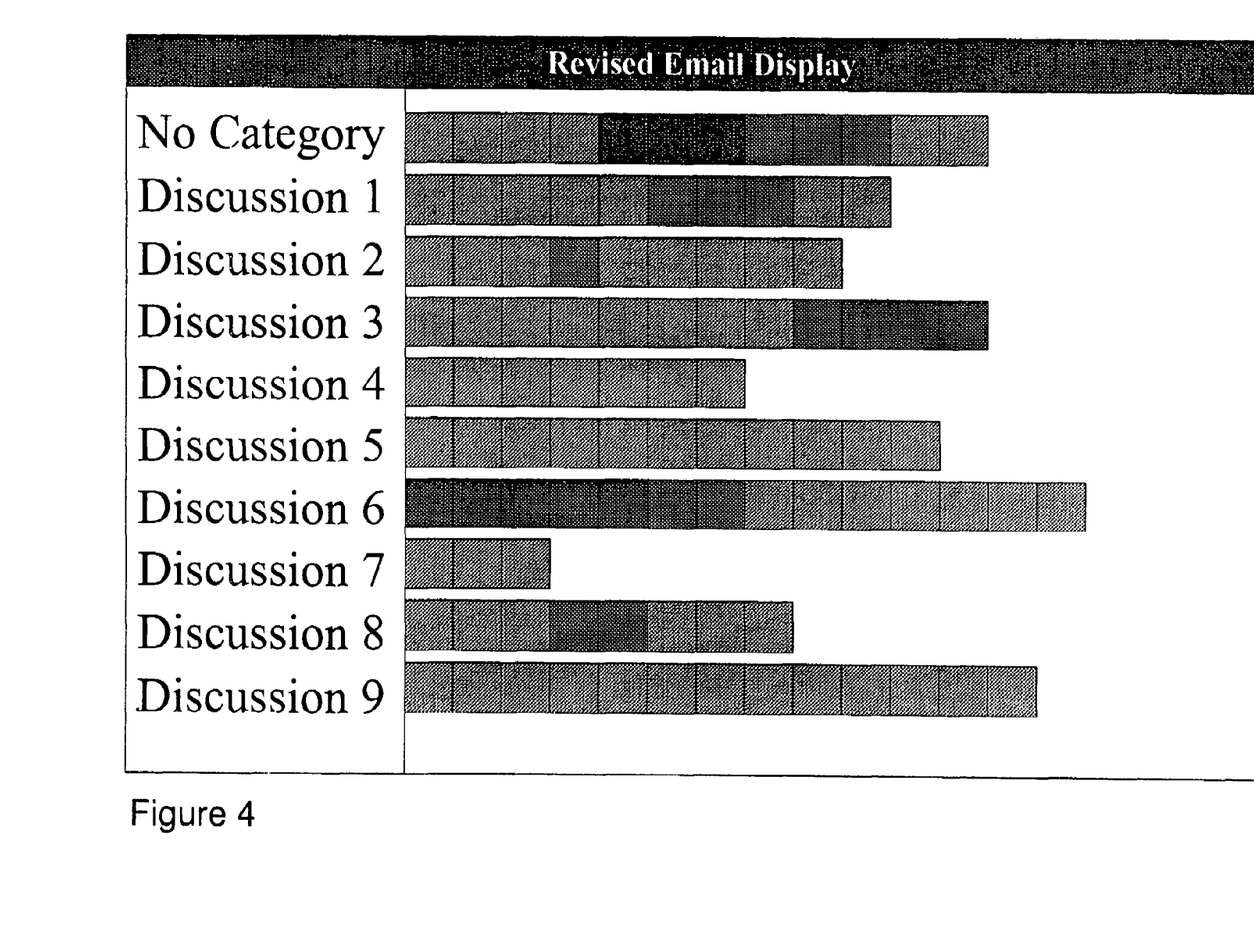
FIG. 4 shows messages displayed with a variation in colour.
Figure 5:
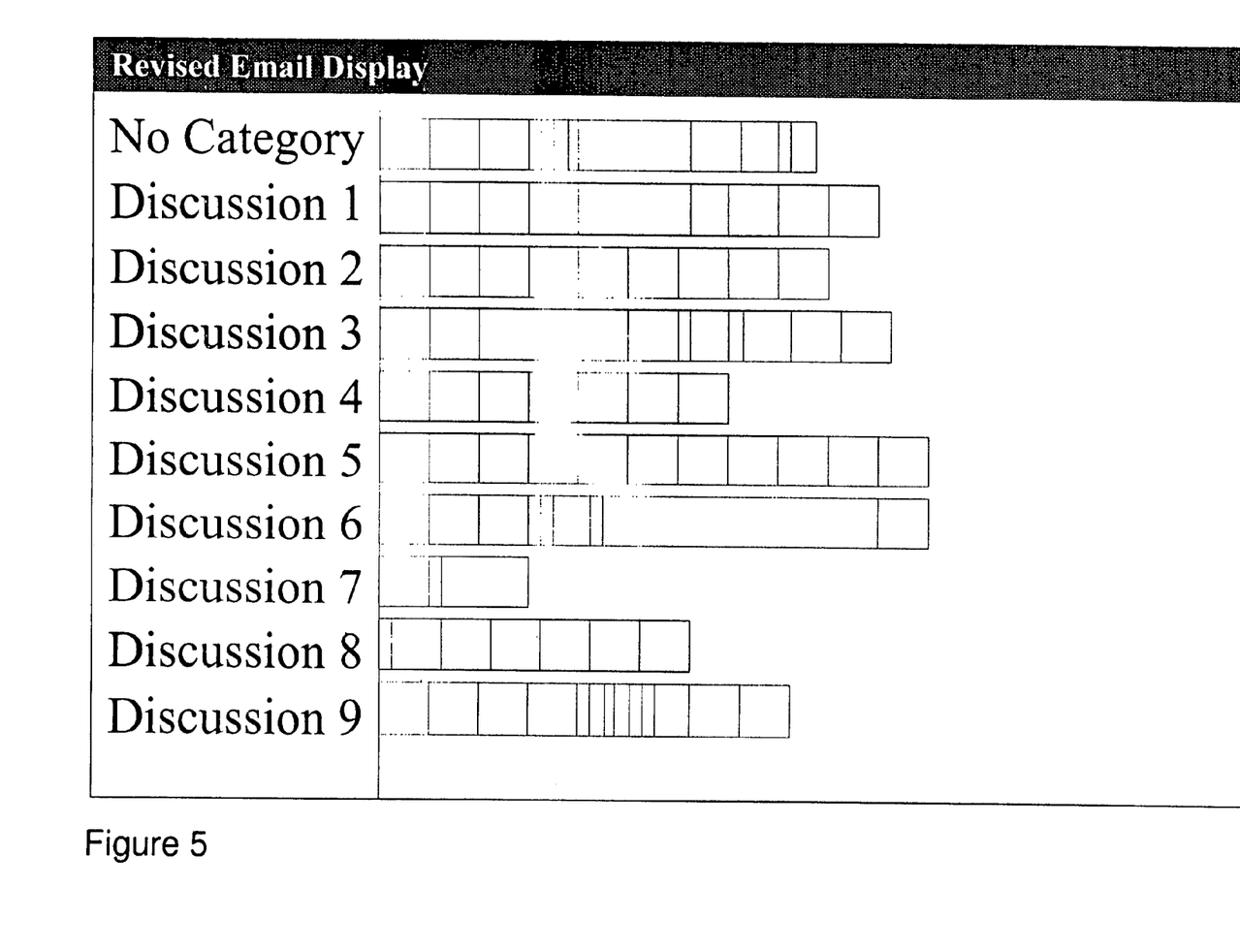
FIG. 5 shows messages displayed with a variation in size.

FIG. 4 presents a schematic of a window produced by the display script where messages are divided into groups "No Category" and "Discussion 1 . . . 9" and displayed in cells extending from their associated group in date order from the newest on the left to the oldest on the right. In FIG. 4, mail is only prioritized against one concept, and it is the redness of the email cells (shown as shades of grey) which varies to reflect the fit to the concept definitions. In FIG. 5, it is the length of the cells which changes according to the fit.

If, however, the user wishes to prioritize against more than one concept, then one concept can be associated with size as a display parameter and another can be associated with a colour as a display parameter. This means that messages closely fitting more than one concept will be associated with large and red cells, and those of little significance will be associated with small and, say, pale pink cells.

Where the user wishes to prioritize against more than two concepts then a number of possibilities may be employed. It will be seen that where four boolean conditions are used, as in FIG. 3, a fit will have 16 different possible values. The system can set a threshold, say 13, above which a message becomes a fit, and below which it is not considered significant. The user can then associate at least two of the concepts with colours, however, it will be seen that only one concept at a time can usefully be associated with size. When a message is tested against a colour associated concept, the cell for that message is only displayed in that colour if it exceeds the threshold. Where a messages exceeds the threshold for two or more concepts, then the colour associated with the concept to which the message fits best is used for the cell. If the message fits two concepts equally, then the message's cell can be displayed in a mixed, hashed or flashing or other highlighted mode or simply one colour or the other may be chosen at random. Thus, the display will shows cells possibly of varying sizes and possibly with cells of differing colours.

In any case, it will be seen that the prioritized view can be displayed instead of, or complementary to, the conventional summary information list.

In the preferred embodiment, the prioritized view is interactive. In Lotus Notes, the message's unique identifier can be associated with its corresponding displayed cell. When the user clicks on the cell associated with a message, then an API call is made to display the message in a conventional manner, allowing the user to read and/or reply to the message.

Possible enhancements to the display include:

the addition of functionality to capture the users feelings about the scale of a concept's applicability and the application of Artificial Intelligence algorithms to develop more sophisticated criteria. This is analogous to the use of AI to understand a user's needs in searching the Internet and would make use of similar technology;

the addition of functionality to enable a manager to impose concept priorities. For example, a manager could state that all emails which referred to client relationships were of a higher priority than internal correspondence; and the use of system monitoring techniques to reflect the level of effort expended by an individual on each group.

It will be seen that the present invention can be applied to the process of prioritizing views of differing types of messages, not necessarily email messages by simply applying the steps of defining one or more concepts against which a message can be prioritized, generating a fit of a message to one or more of such concepts and creating a display representative of the fit of such messages to the concepts. For example, the invention can be applied to viewing messages in queues.

What is claimed is:

1. A method for generating a prioritized view of a plurality of messages, comprising the steps of: defining one or more concepts against which a message can be prioritized, the or each concept comprising one or more conditions against which a message can be tested; for each message, generating a fit to a selected one or more said concepts, said corresponding to whether or not said message fulfils said conditions; and creating a display representative of the respective fits of said messages to said one or more selected concepts, wherein each concept comprises one or more scenarios, the or each scenario comprising one or more of said conditions, and wherein said fit generating step comprises testing each message against the or each condition in the or each scenario for a user selected concept to generate a for the or each scenario.

2. A method as claimed in claim 1 wherein said display creating step comprises displaying respective cells associated with messages in one or more rows or columns.

3. A method as claimed in claim 2 wherein said concept defining step comprises associating a concept with a display parameter comprising one of a colour or size.

4. A method as claimed in claim 3 wherein said display creating step is responsive to a user selecting a prioritized view according to a concept associated with a colour, to display said cells in an intensity of said colour proportional to the fit of their associated message to said concept.

5. A method as claimed in claim 3 wherein said display creating step is responsive to a user selecting a prioritized view according to a concept associated with size, to display said cells with a length proportional to the fit of their associated message to said concept.

6. A method as claimed in claim 3 wherein said display creating step is responsive to a user selecting a prioritized view according to a first concept associated with a colour and a second concept associated with size, to display said cells in an intensity of said colour proportional to the fit of their associated message to said first concept and with a length proportional to the fit of their associated message to said second concept.

7. A method as claimed in claim 3 wherein said display creating step is responsive to a user selecting a prioritized view according to first and second concepts, each associated with a respective colour, to display said cells in a colour according to the best fit of their associated message to one of said first and second concepts.

8. A method as claimed in claim 7, wherein said display creating step is responsive to a user selecting a prioritized view according to a third concept associated with size, to display said cells with a length proportional to the fit of their associated message to said third concept.

9. A method as claimed in claim 2 comprising the step of: grouping messages into a plurality of groups, and wherein said display creating step comprises displaying respective cells associated with messages in a row or column extending from their associated groups.

10. A method as claimed in claim 9 wherein said grouping step comprises grouping said messages in discussion threads.

11. A method as claimed in claim 9 wherein said grouping step comprises grouping said messages according to their subject matter.

12. A method as claimed in claim 9 wherein said messages are grouped by said user into a plurality of folders.

13. A method as claimed in claim 9 wherein messages groups containing less than a predetermined number of messages are merged into a "No Category" group.

14. A method as claimed in claim 1 wherein said messages are email messages.

15. A method as claimed 1 wherein said fit for said concept is the highest of said fits for the or each scenario.

16. A method as claimed 1 wherein said fit for said concept is the aggregate of said fits for the or each scenario.

17. A computer program product comprising computer program code stored on a computer readable storage medium for, when executed on a computing device, generating a prioritized view of a plurality of messages, the program code comprising means for performing the steps of claim 1.

18. A message viewer for generating a prioritized view of a plurality of messages, comprising: means for defining one or more concepts against which a message can be prioritized, the or each concept comprising one or more conditions against which a message can be tested; means, operable on each message, for generating a fit to a selected one or more of said concepts, said fit corresponding to whether or not said message fulfils said conditions; and means for creating a display representative of the respective fits of said messages to said one or more selected concepts, wherein each concept comprises one or more scenarios, the or each scenario comprising one or more of said conditions, and wherein said fit generating step comprises testing each message against the or each condition in the or each scenario for a user selected concept to generate a for the or each scenario. The closest prior art of Griesau and Abecassis discloses a conventional.

* * * * *

UNITED STATES PATENT AND TRADEMARK OFFICE
CERTIFICATE OF CORRECTION

| | | |
|---|---|---|
| PATENT NO. | : 7,107,544 B1 | |
| APPLICATION NO. | : 09/453127 | |
| DATED | : September 12, 2006 | |
| INVENTOR(S) | : James Steven Luke | |

It is certified that error appears in the above-identified patent and that said Letters Patent is hereby corrected as shown below:

Col. 8, Line 49, Delete the phrase "The closest prior art of Griesau and Abecassis discloses a conventional." at the end of Claim 18.

Signed and Sealed this

Fifth Day of December, 2006

JON W. DUDAS
*Director of the United States Patent and Trademark Office*